United States Patent [19]

Oku

[11] Patent Number: 5,202,725
[45] Date of Patent: Apr. 13, 1993

[54] HIGH VOLTAGE POWER SUPPLY CONTROL APPARATUS

[75] Inventor: Juntaro Oku, Numazu, Japan

[73] Assignee: Tokyo Electric Co., Ltd., Tokyo, Japan

[21] Appl. No.: 735,300

[22] Filed: Jul. 24, 1991

[30] Foreign Application Priority Data

Jul. 27, 1990 [JP] Japan .................................. 2-197852

[51] Int. Cl.$^5$ ............................................. G03B 27/72
[52] U.S. Cl. ..................................... 355/69; 323/272; 363/21; 363/41; 363/71; 307/29
[58] Field of Search .................... 355/68, 69; 323/272, 323/283, 289; 363/21, 41, 65, 71; 307/29, 52, 55

[56] References Cited

U.S. PATENT DOCUMENTS

| | | | |
|---|---|---|---|
| 4,128,771 | 12/1978 | Domenico | 323/19 X |
| 4,290,101 | 9/1981 | Hergenhan | 363/65 |
| 4,908,753 | 3/1990 | Takahashi | 363/21 |
| 5,045,712 | 9/1991 | Baggenstoss | 363/26 X |

FOREIGN PATENT DOCUMENTS

| | | |
|---|---|---|
| 52-51824 | 4/1977 | Japan . |
| 55-43691 | 11/1980 | Japan . |
| 55-157759 | 12/1980 | Japan . |
| 56-145453 | 11/1981 | Japan . |
| 58-16497 | 3/1983 | Japan . |
| 2-13038 | 1/1990 | Japan . |
| 2047923 | 12/1980 | United Kingdom . |

Primary Examiner—Donald A. Griffin
Assistant Examiner—D. Rutledge
Attorney, Agent, or Firm—Frishauf, Holtz, Goodman & Woodward

[57] ABSTRACT

A high voltage power supply controller includes a plurality of high voltage transformers, and causes the high voltage transformers to generate high voltages upon switching operations of corresponding switching transistors, to there by apply the high voltages to loads. The controller includes a plurality of monitor voltage detectors for respectively monitoring changes in high voltages generated in the high voltage transformers, a multiplexer for sequentially selecting monitor voltages from the monitor voltage detectors at predetermined timings so as to supply the selected monitor voltage to a common analog-to-digital converter, an arithmetic operator for comparing a digital value from the analog-to-digital converter with a predetermined reference value and adding a comparison operation result to a feedback value so as to obtain an output value, a plurality of latches for latching arithmetic outputs corresponding to the monitor voltages output from the arithmetic operator and supplying the latched values to the arithmetic operator as the feedback values, a reference counter for counting reference clocks, and an output control circuit for controlling duty ratios for the switching operations of the switching transistors on the basis of a predetermined frequency reference value, the values latched by the latches, and a count value from the reference counter.

14 Claims, 10 Drawing Sheets

HIGH VOLTAGE POWER SUPPLY CONTROL APPARATUS

BACKGROUND OF THE INVENTION

1. Field of the Invention

The present invention relates to a high voltage power supply control apparatus used in an electrophotographic mechanism section having a photosensitive body in a copying machine, a laser printer, or the like.

2. Description of the Related Art

An electrophotographic mechanism section used in a copying machine, a laser printer, or the like comprises, e.g., a photosensitive drum. After a photosensitive body of the photosensitive drum is charged by a charging unit, the photosensitive body is exposed by an exposure unit to form an electrostatic latent image on the photosensitive body. A toner is applied to the electrostatic latent image by a developer unit to form a toner image. The toner image is transferred onto transfer paper by a transfer unit.

The electrophotographic mechanism section comprises a high voltage power supply controlling apparatus for applying a high voltage to a charger in the charging unit, a developer sleeve in the developer unit, and a transfer charger in the transfer unit.

In this apparatus, however, since PWM (pulse-width modulation) controllers and A/D (analog-to-digital) converters are arranged in correspondence with charging, transferring, and biasing sections, the number of circuit members to be used is undesirably increased, and the apparatus become bulky. Since the PWM controllers are independently operated, each PWM controller suffers from a long operation rest period, resulting in poor operation efficiency.

SUMMARY OF THE INVENTION

It is, therefore, an object of the present invention to provide a high voltage power supply control apparatus which can use one PWM controller and one A/D converter commonly in a plurality of high voltage generation control operations, and can, therefore, reduce the number of circuit members to be used, can render the apparatus compact, and can improve operation efficiency of the PWM controller.

According to the present invention, there is provided a high voltage power supply control apparatus which includes a plurality of high voltage transformers which generate high voltages upon switching operations of corresponding switching means so as to apply the high voltages to loads, the apparatus comprising a plurality of monitor voltage detectors for respectively monitoring changes in high voltages generated in the high voltage transformers, a multiplexer for sequentially selecting monitor voltages from the plurality of monitor voltage detectors at predetermined timings, and supplying the selected monitor voltage to a common analog-to-digital converter, an arithmetic operator for comparing and operating a digital value from the analog-to-digital converter with a predetermined reference value, and adding a comparison operation result to a feedback value to obtain an output value, a plurality of latches for latching arithmetic outputs, corresponding to the monitor voltages, output from the arithmetic operator, and supplying the latched values to the arithmetic operator as the feedback values, a reference counter for counting reference clocks, and output control means for controlling duty ratios for the switching operations of the switching means on the basis of a predetermined frequency reference value, the values latched by the plurality of latches, and a count value from the reference counter.

According to the present invention, the arithmetic operator may output an error signal when the output value obtained from an arithmetic result falls outside a predetermined range.

According to the present invention, means for checking the digital value from the analog-to-digital converter, and for, when the digital value falls outside a predetermined range, outputting an error signal may be arranged.

According to the present invention with the above arrangement, changes in high voltages generated by the high voltage transformers are monitored by the corresponding monitor voltage detectors. Monitor voltages from the monitor voltage detectors are sequentially selected by a multiplexer at predetermined timings, and the selected voltage is supplied to the A/D converter. The voltage is converted into a digital value, and is then supplied to the arithmetic operator.

The arithmetic operator compares the input digital value with a predetermined reference value, and adds the comparison result to a feedback value from the latch to obtain an output value.

The output values, corresponding to the monitor voltages, output from the arithmetic operator are latched by the plurality of latches.

The duty ratios of the switching means are controlled by a predetermined frequency reference value, the values latched by the latches, and a count value of the reference counter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A-7F are timing charts showing signals produced by the microprocessor in FIG. 1;

FIGS. 8A-8G are timing charts showing signals produced by the timing controller in FIG. 2.

DETAILED DESCRIPTION OF THE PREFERRED EMBODIMENTS

An embodiment of the present invention will be described below with reference to the accompanying drawings. In this embodiment, the present invention is applied to high voltage generation control in an electrophotographic mechanism section.

Figure 1:
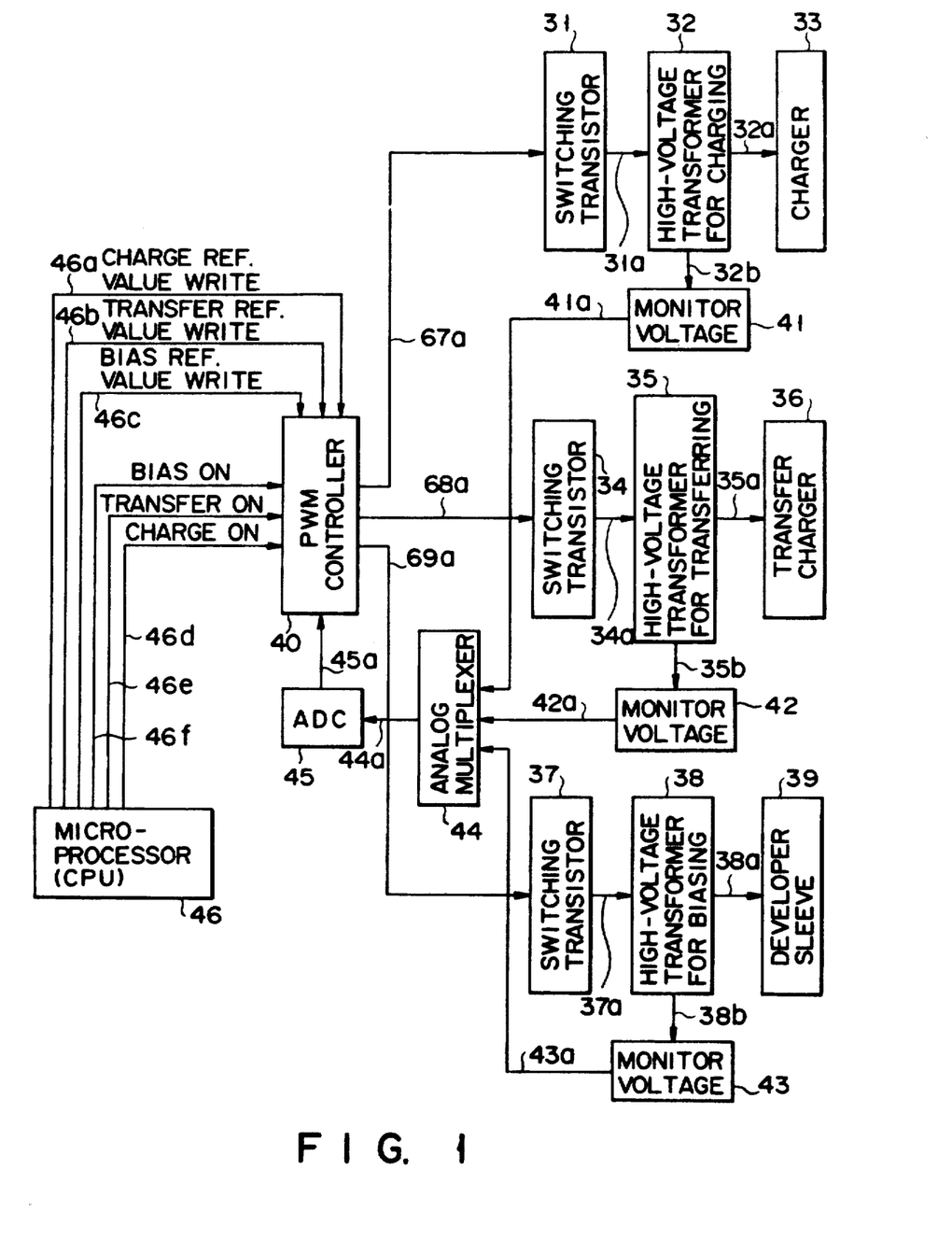
FIG. 1 shows a configuration of a high voltage power supply control apparatus according to an embodiment of the present invention.

As shown in FIG. 1, high voltage transformer 32 for charging is caused to generate a high voltage upon a switching operation of switching transistor 31, and the high voltage is applied to charger 33. High voltage transformer 35 for transferring is caused to generate a high voltage upon a switching operation of switching transistor 34, and the high voltage is applied to transfer charger 36. Furthermore, high voltage transformer 38 for biasing is caused to generate a high voltage upon a switching operation of switching transistor 37, and the high voltage is applied to developer sleeve 39.

Switching transistors 31, 34, and 37 are subjected to switching control based on pulse signals 67a, 68a, and 69a from common PWM (pulse-width modulation) controller 40.

Changes in high voltages 32b, 35b, and 38b generated by high voltage transformers 32, 35, and 38 are monitored by monitor voltage detectors 41, 42, and 43, and their monitor outputs 41a, 42a, and 43a are supplied to analog multiplexer 44.

Analog multiplexer 44 sequentially selects the monitor outputs from monitor voltage detectors 41, 42, and 43 at predetermined timings, and supplies the selected output (44a) to common A/D converter (ADC) 45.

ADC 45 converts the input monitor voltage into digital value 45a, and supplies the digital value to PWM controller 40.

PWM controller 40 receives charge, transfer, and bias ON signals 46d, 46e, and 46f from micro processor (CPU) 46, and also receives charge, transfer, and bias reference values 46a, 46b, and 46c as write data.

Figure 2A:
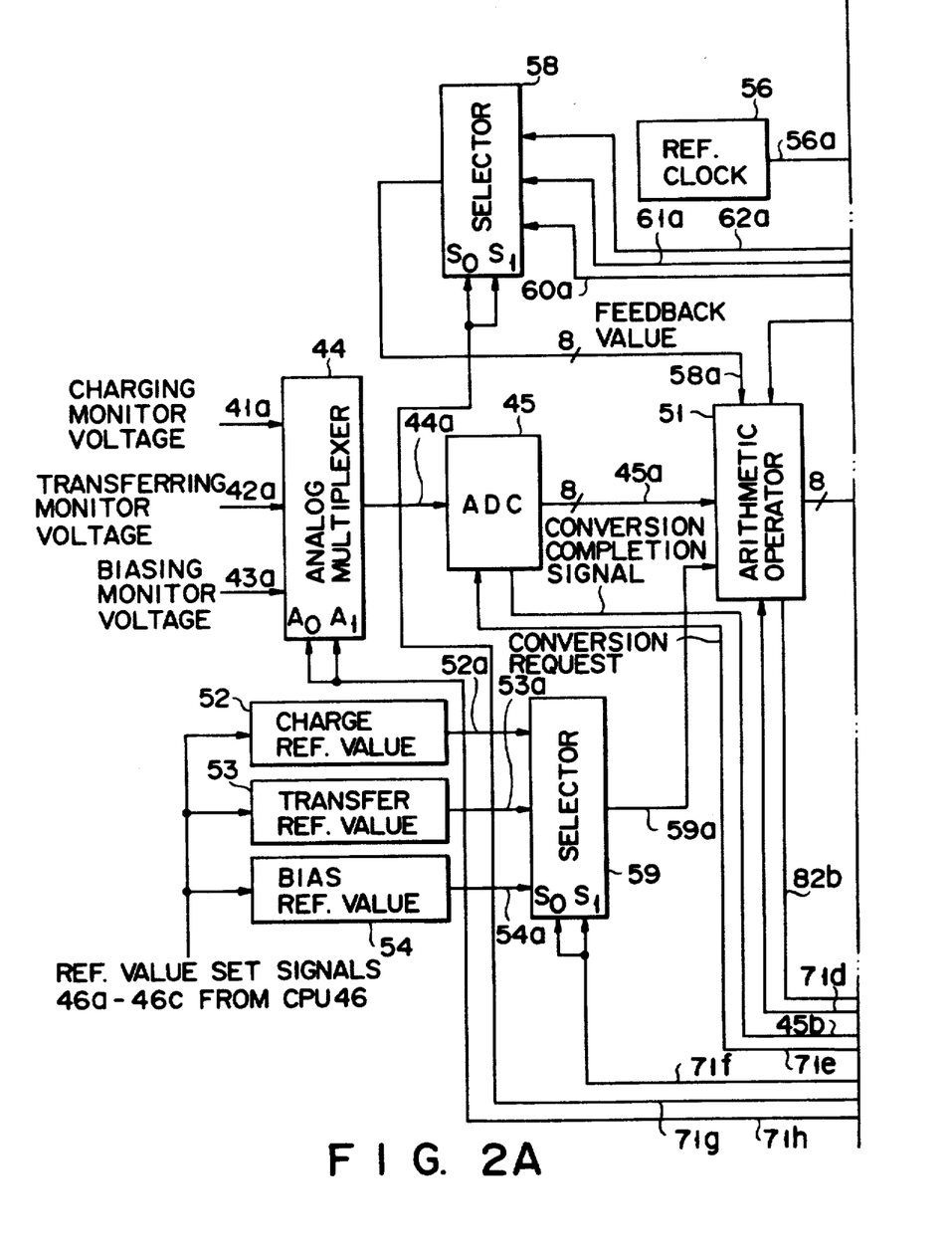
FIGS. 2A and 2B are block diagrams showing details of the PWM controller shown in FIG. 1.
Figure 2B:
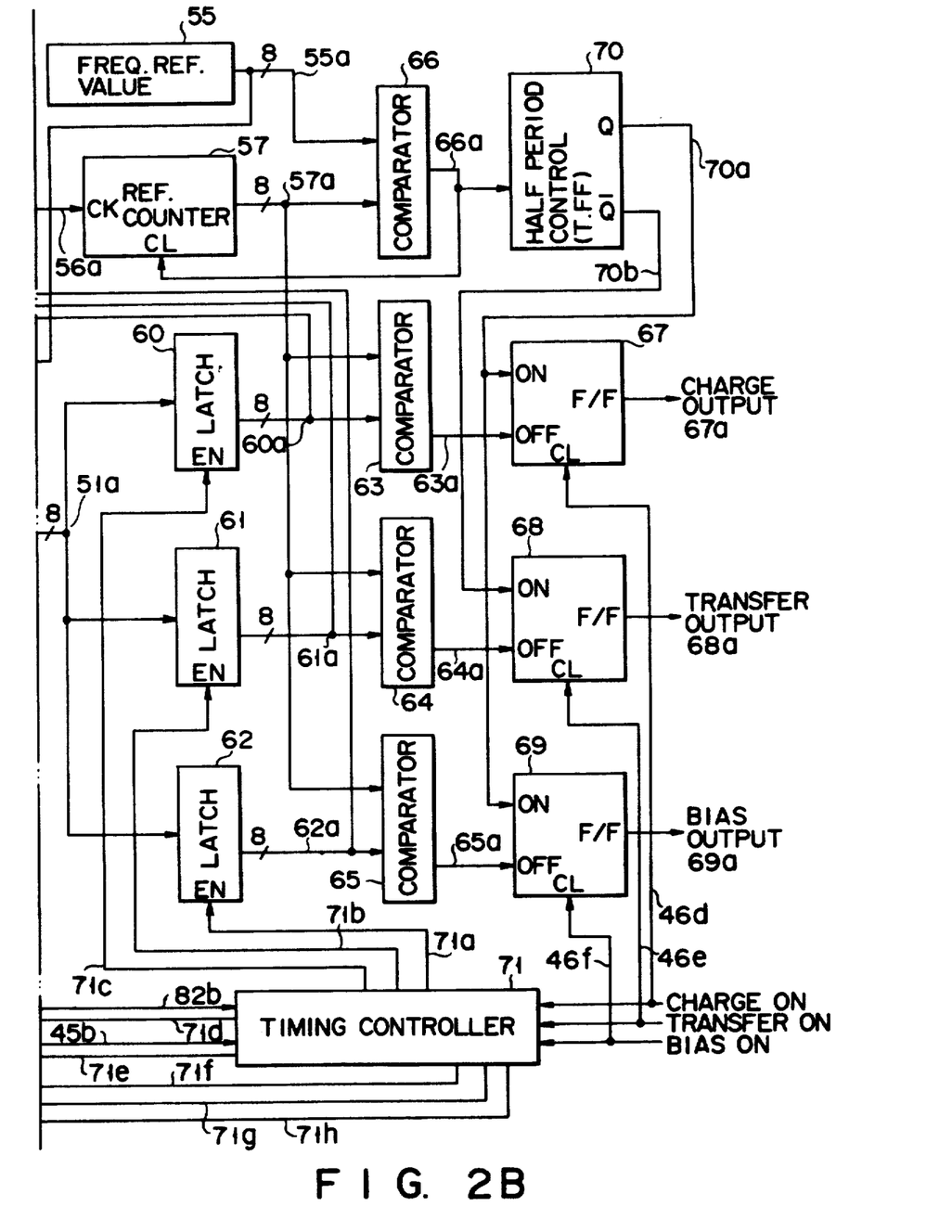

As shown in FIG. 2, PWM controller 40 comprises arithmetic operator 51, charge reference value setting unit 52, transfer reference value setting unit 53, bias reference value setting unit 54, frequency reference value setting unit 55, reference clock generator 56, reference counter 57 for counting reference clocks 56a from reference clock generator 56, first and second selectors 58 and 59, first, second, and third latches 60, 61, and 62, first, second, third, and fourth comparators 63, 64, 65, and 66, first, second, and third flip-flops (F/Fs) 67, 68, and 69, half period control circuit 70, and timing controller 71 for controlling analog multiplexer 44, ADC 45, arithmetic operator 51, first and second selectors 58 and 59, and first, second, and third latches 60, 61, and 62 at predetermined timings.

PWM controller 40 supplies digital monitor voltage 45a from ADC 45 to arithmetic operator 51, and supplies charge, transfer, and bias ON signals 46d, 46e, and 46f from CPU 46 to timing controller 71 and to clear terminals CL of first, second, and third F/Fs 67, 68, and 69.

The reference values are set in charge, transfer, and bias reference value setting units 52, 53, and 54 by write data of charge, transfer, and bias reference values 46a, 46b, and 46c from CPU 46.

Analog multiplexer 44 selects one of charge, transfer, and bias monitor voltages 41a, 42a, and 43a in accordance with control signal 71h from timing controller 71, and supplies the selected monitor voltage to ADC 45.

First selector 58 selects one of outputs 60a, 61a, and 62a from latches 60, 61, and 62 in accordance with control signal 71g from timing controller 71, and supplies the selected output as feedback value 58a to arithmetic operator 51.

Second selector 59 selects one of the reference values 52a, 53a, and 54a from charge, transfer, and bias reference value setting units 52, 53, and 54 in accordance with control signal 71f from timing controller 71, and supplies selected reference value 59a to arithmetic operator 51.

A frequency reference value from frequency reference value setting unit 55 is supplied to arithmetic unit 51, and fourth comparator 66.

Figure 3:
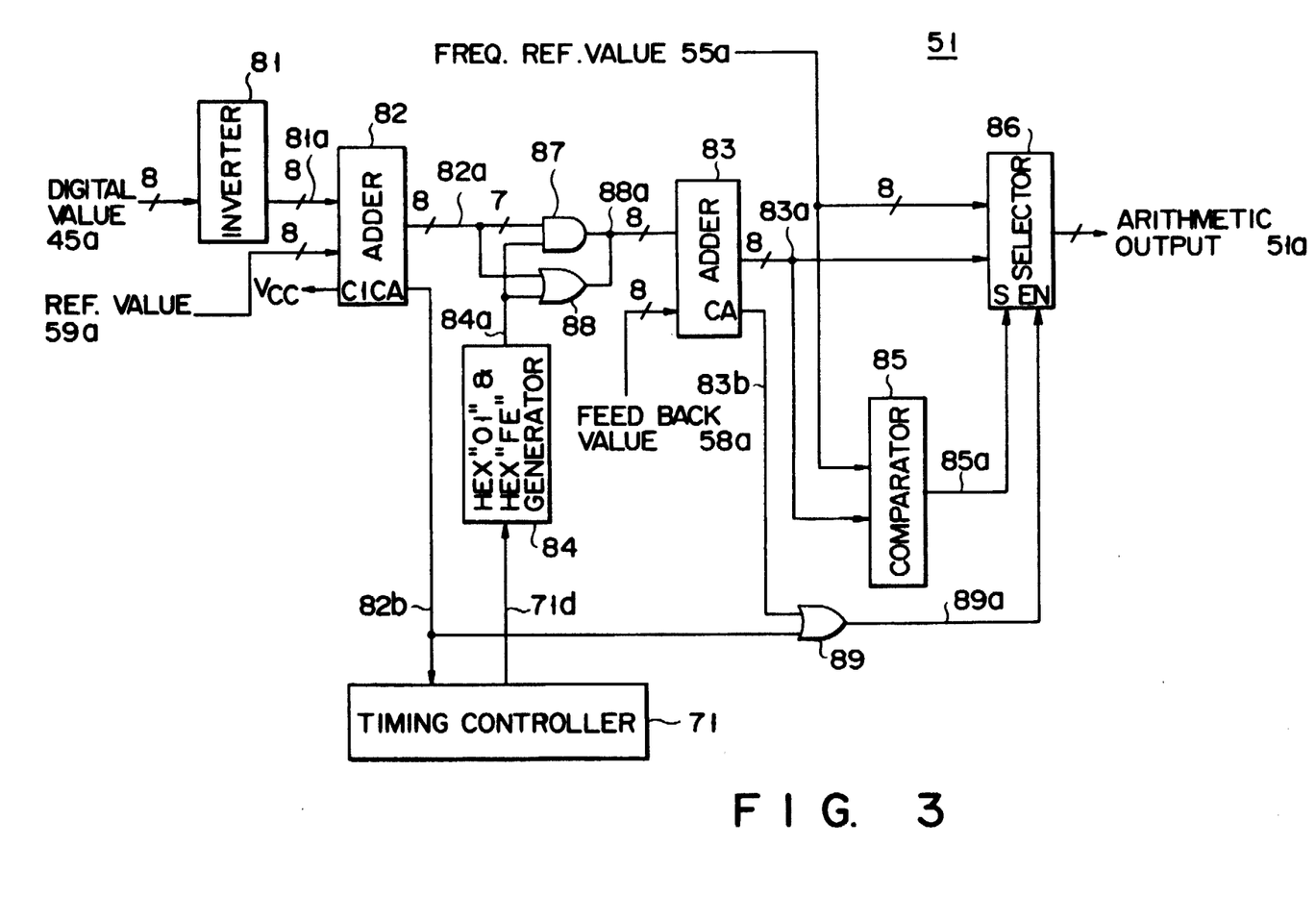
FIG. 3 is a block diagram showing details of the arithmetic operator shown in FIG. 2.

As shown in FIG. 3, arithmetic operator 51 comprises inverter 81, first and second adders 82 and 83, hex "01" & hex "FE" data generator 84, comparator 85, and selector 86. Digital value 45a from ADC 45 is supplied to first adder 82 via inverter 81. First adder 82 also receives reference value 59a selected by second selector 59.

Figure 3A:
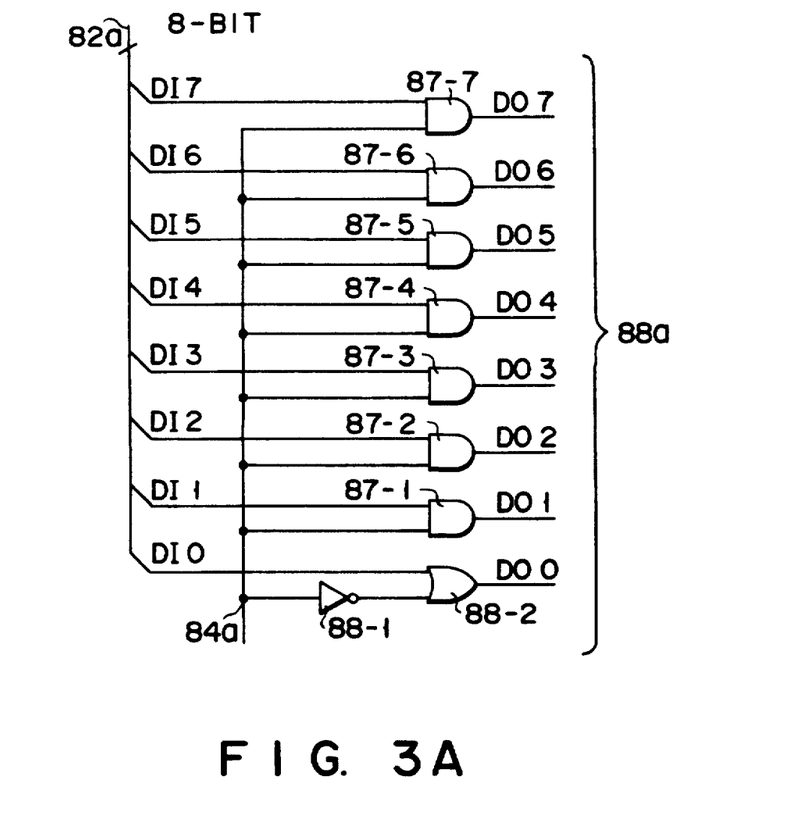
FIG. 3A shows a circuit connection of the AND/OR gates in FIG. 3.

First adder 82 outputs 8-bit data 82a. Of the 8-bit data, 7-bit data is supplied to AND gate 87, and 1-bit data is supplied to OR gate 88. More specifically, as is shown in FIG. 3A, AND gate 87 is formed of an array of seven AND gates 87-1 to 87-7, and OR gate 88 is formed of a combination of inverter 88-1 and OR gate 88-2. In FIG. 3A, 8-bit input data 82a is represented by bits DI0 to DI7, and 8-bit output data 88a is represented by bits D00 to D07.

Hex "01" & hex "FE" data generator 84 is controlled by signal 71d form timing controller 71. Generator 84 outputs hex "01" data until digital value 45a from ADC 45 coincides with reference value 59a from second selector 59 (signal 84a has a low level), and then outputs hex "FE" data after the digital value exceeds the reference value (signal 84a has a high level). Generator 84 supplies the generated data to AND gate 87 and OR gate 88.

Output 88a from AND gate 87 and OR gate 88 is supplied to second adder 83. Second adder 83 also receives feedback value 58a from first selector 58.

Second adder 83 adds feedback value 58a and data 88a from AND gate 87 and OR gate 88, and supplies the sum (83a) to selector 86 and comparator 85.

Selector 86 and comparator 85 receive frequency reference value 55a from frequency reference value setting unit 55.

Comparator 85 compares sum 83a and frequency reference value 55a, and outputs signal 85a for causing selector 86 to select sum 83a before sum 83a reaches frequency reference value 55a. When sum 83a exceeds frequency reference value 55a, comparator 85 outputs signal 85a for causing selector 86 to select frequency reference value 55a.

When sums 82a and 83a from adders 82 and 83 have negative values, signals 82b and 83b having low levels are output from carry terminals CA, thereby canceling an enable state of selector 86 according to logical sum 89a of signals 82b and 83b. Thus, selector 86 sets arithmetic output value 51a to be zero.

The output value from selector 86 corresponds to output value 51a from arithmetic operator 51, and is supplied to latches 60, 61, and 62, as shown in FIG. 2. Latches 60, 61, and 62 are controlled by signals 71a–71c from timing controller 71. In a charge ON state, latch 60 latches output value 51a. In a transfer ON state, latch 61 latches output value 51a. In a bias ON state, latch 62 latches output value 51a.

Latches 60, 61, and 62 respectively supply latched values 60a, 61a, and 62a to first, second, and third comparators 63, 64, and 65. Comparators 63, 64, 65, and 66 receive count value 57a from reference counter 57.

Fourth comparator 66 is activated when count value 57a from reference counter 57 coincides with frequency reference value 55a from frequency reference value setting unit 55, and supplies its output 66a to clear terminal CL of reference counter 57 and also to half period control circuit 70. Frequency reference value 55a from frequency reference value setting unit 55 is set to be half a transistor switching frequency, and half period control circuit 70 shifts ON timings of first and third F/Fs 67 and 69 from that of second F/F 68 by a half period. More specifically, Q terminal output 70a from half period control circuit 70 is supplied to the ON terminals of first and third F/Fs 67 and 69, and $\bar{Q}$ terminal output 70b is supplied to the ON terminal of second F/F 68, thereby shifting charge and bias ON periods from a transfer ON period by a half period.

First, second, and third comparators 63, 64, and 65 are activated when count value 57a from reference counter 57 matches outputs 60a, 61a, and 62a from latches 60, 61, and 62, and supply their outputs 63a, 64a, and 65a to the OFF terminals of first, second, and third F/Fs 67, 68, and 69.

First, second, and third F/Fs 67, 68, and 69 output charge, transfer, and bias outputs 67a, 68a, and 69a for driving switching transistors 31, 34, and 37, respectively.

Clear terminals CL of first, second, and third F/Fs 67, 68, and 69 receive the charge, transfer, and bias ON signals 46d, 46e, and 46f from CPU 46, respectively.

Figure 4:
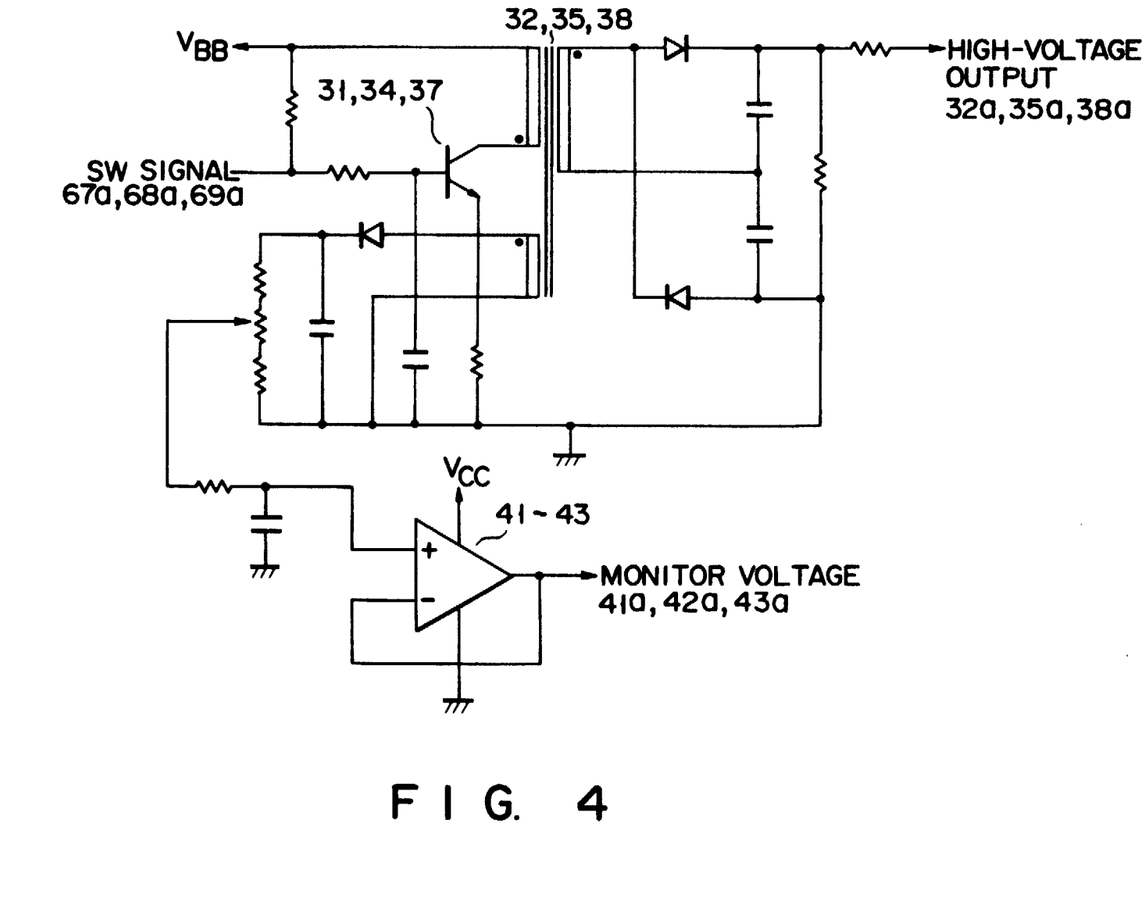
FIG. 4 is an example circuit of the monitor voltage detector and a peripheral circuit of the high voltage transformer.
Figure 5:
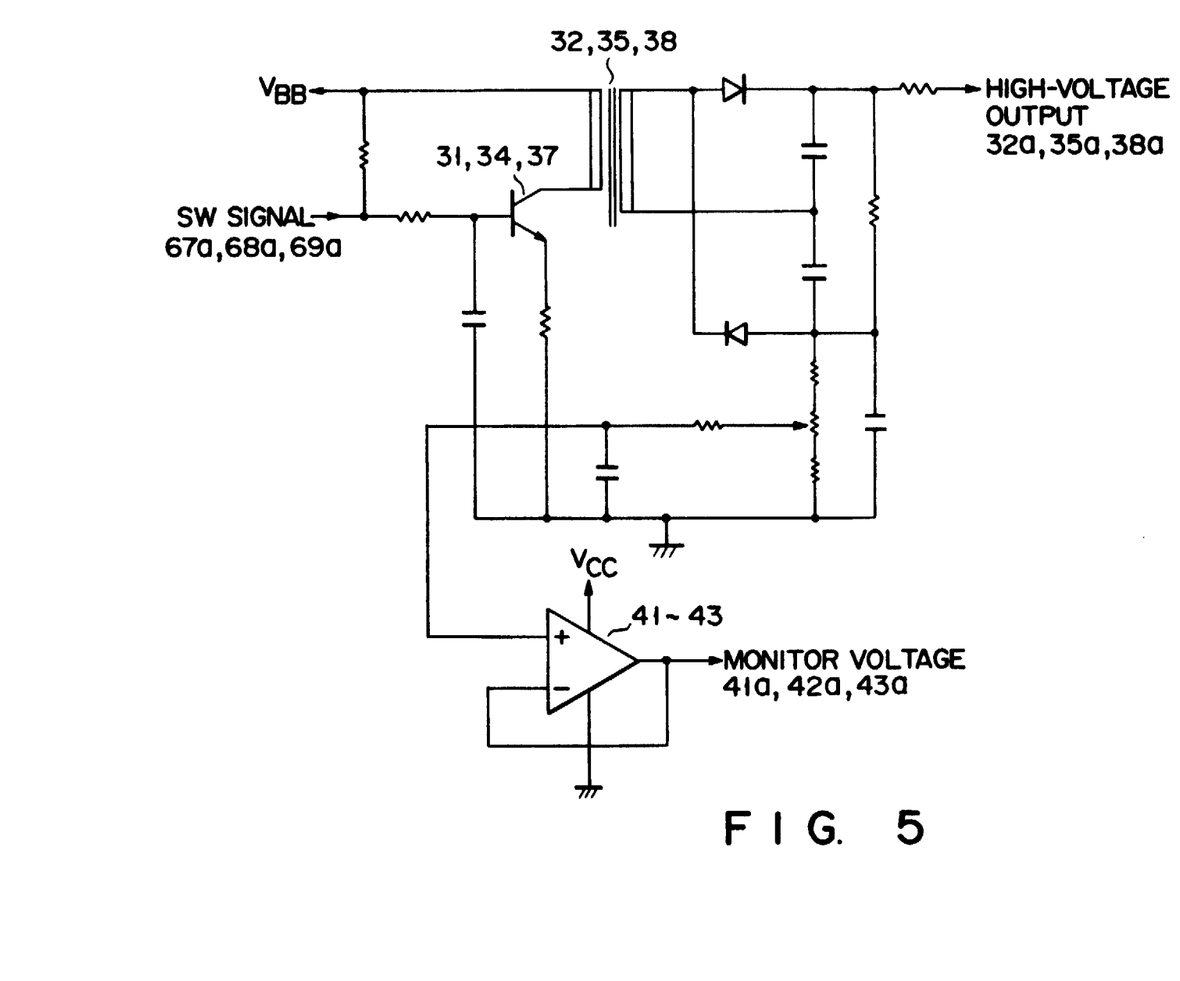
FIG. 5 is another example circuit of the monitor voltage detector and a peripheral circuit of the high voltage transformer.

FIGS. 4 and 5 show detailed circuit arrangements constituted by switching transistors 31, 34, and 37, high voltage transformers 32, 35, and 38, and monitor voltage detectors 41, 42, and 43. FIG. 4 shows an arrangement employing a constant voltage control system, and FIG. 5 shows an arrangement employing a constant current control system.

According to this embodiment with the above arrangement, when a power switch (for $V_{BB}$) is turned on, CPU 46 sets the charge, transfer, and bias reference values in setting units 52, 53, and 54 of PWM controller 40, respectively.

In this state, when CPU 46 inputs one of the charge, transfer, and bias ON signals to timing controller 71, timing controller 71 starts an operation. Timing controller 71 sequentially switches three input addresses of analog multiplexer 44 at predetermined timings. Every time the address is switched, controller 71 issues conversion request 71e to ADC 45.

Digital value 45a from ADC 45 is supplied to arithmetic operator 51. Since a monitor voltage output is zero immediately after an output ON state (at system start time), A/D-converted digital value 45a also becomes zero. Thus, hex "01" & hex "FE" data generator 84 outputs hex "01" data (84a) immediately after the output ON state, and supplies it to second adder 83. Feedback value 58a input to second adder 83 is also initially zero, and an adder output becomes hex "01".

Since the value of hex "01" is smaller than frequency reference value 55a, selector 86 selects adder output 83a. In this manner, selector 86 selects adder output 83a at the time of start of the system.

On the other hand, first and second selectors 58 and 59 perform selections in correspondence with the input address selection of analog multiplexer 44 under the control of timing controller 71, and respectively supply feedback value 58a and reference value 59a to arithmetic operator 51.

Latches 60, 61, and 62 are also set in a latch enable state corresponding to the input address selection of analog multiplexer 44 under the control of timing controller 71.

Fourth comparator 66 is activated when count value 57a from reference counter 57 coincides with frequency reference value 55a. Thus, first and third F/Fs 67 and 69 are enabled first, and then, second F/F 68 is enabled after an elapse of a half period. Reference counter 57 is cleared at the activation timing of fourth comparator 66.

First, second, and third comparators 63, 64, and 65 are activated when count value 57a from reference counter 57 coincides with the values respectively latched by latches 60, 61, and 62, and turn OFF first, second, and third F/Fs 67, 68, and 69, respectively.

In this manner, the duty ratio of charge output 67a to switching transistor 31 is controlled by the OFF timing of first F/F 67, the duty ratio of transfer output 68a to switching transistor 34 is controlled by the OFF timing of second F/F 68, and the duty ratio of bias output 69a to switching transistor 37 is controlled by the OFF timing of third F/F 69.

The switching periods of switching transistors 31, 34, and 37 are controlled by frequency reference value 55a, and the switching duty ratios of switching transistors 31, 34, and 37 are controlled by arithmetic output value 51a from arithmetic operator 51.

In this manner, since high voltage generation control operations for charging, transferring, and developer biasing can be controlled by using one PWM controller 40 and one ADC 45, the number of circuit members to be used can be reduced, and the apparatus can be rendered compact. Since PWM controller 40 sequentially performs high voltage generation control operations; a rest time is short, and operation efficiency can be improved.

At an early timing of an output ON state, since the latched value is zero, the duty ratio corresponds to one reference clock (56a) from reference clock generator 56. Thereafter, the duty ratio is gradually increased by one reference clock, and when A/D-converted digital value 45a exceeds reference value 59a from one of reference value setting units 52, 53, and 54, an output from data generator 84 is switched to hex "FE" data.

Thus, second adder 83 receives output 82a(=88a) from first adder 82. More specifically, a difference between reference value 59a and digital value 45a (a complementary number of 2) is input to second adder 83, and is added to feedback value 58a.

When reference value 59a is larger than digital value 45a, the increased difference feedback value serves as a new duty ratio, so that the output is increased. On the other hand, when reference value 59a is smaller than digital value 45a, the decreased difference feedback value serves as another new duty ratio, and the output is decreased.

When output value 83a from adder 83 exceeds frequency reference value 55a in comparator 85, selector 86 is operated to select reference value 55a. When the sums (82a, 83a) from adders 82 and 83 become negative, carry signals are generated from carry terminals CA of adders 82 and 83, and as a result, the enable state of selector 86 is canceled by logical sum 89a of these carry signals, thus making the arithmetic output zero.

When arithmetic result 51a becomes zero or when the arithmetic result reaches a predetermined dead time, this is informed to CPU 46, and CPU 46 determines an abnormality, and can stop an output. More specifically, when output value 51a obtained as a result of the arithmetic operation in arithmetic operator 51 falls outside a predetermined range, an error signal may be output.

When the circuit shown in FIG. 4 is used, if an output is short-circuited, a monitor voltage becomes zero. For this reason, the duty of the output is increased up to a dead time. Thus, this state can be informed to CPU 46 to stop an output.

When the circuit shown in FIG. 5 is used, if an output is set in an open state, no current flows, and a monitor voltage becomes zero. For this reason, the duty of the output is increased up to a dead time. Thus, this state can be informed to CPU 46 to stop an output.

Furthermore, a means for directly comparing digital value 45a from ADC 45 with upper and lower limit values for detecting an error may be arranged, and when the digital value falls outside a range defined between the upper and lower limit values, an error signal may be output to inform an abnormality to CPU 46.

In this embodiment, the present invention is applied to high voltage generation control in an electrophotographic mechanism section. However, the present invention is not always limited to this.

Figure 6:
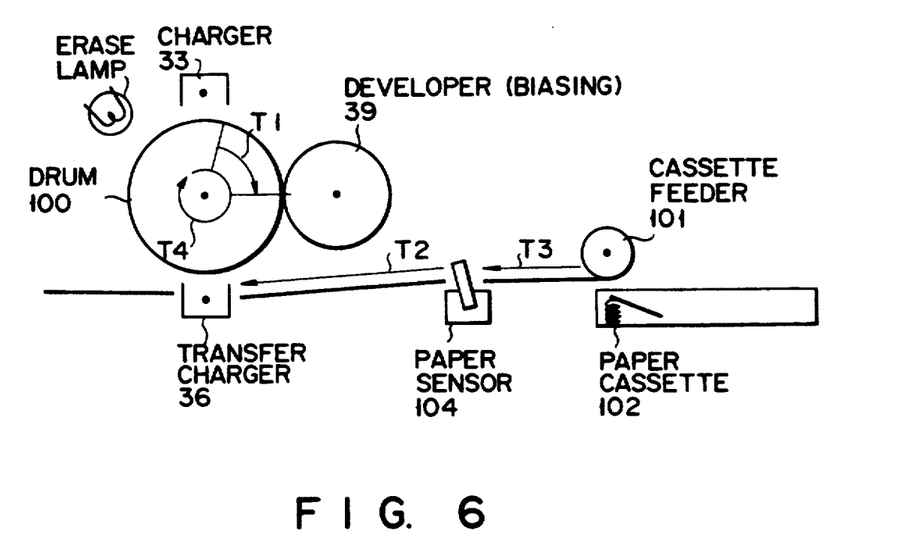
FIG. 6 illustrates a schematic mechanical configuration of an electronic photographing apparatus to which a high voltage power supply control apparatus of the invention can be applied.
Figures 7A, 7B:
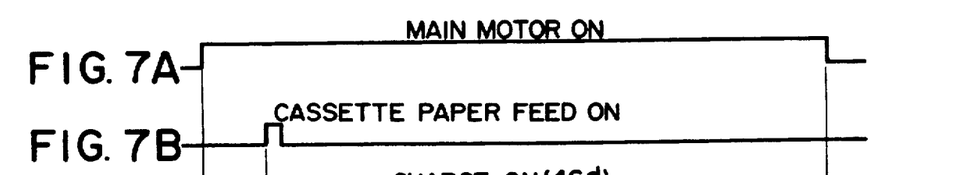
Figures 7C, 7D, 7E, 7F:
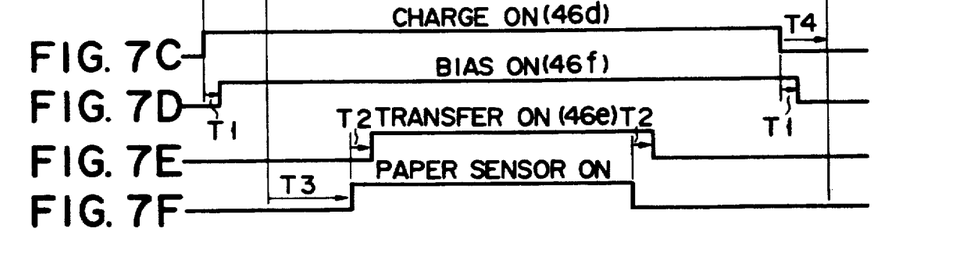

FIG. 6 illustrates a schematic mechanical configuration of an electronic photographing apparatus to which a high voltage power supply control apparatus of the invention can be applied. FIGS. 7A-7F show signals produced by microprocessor 46 in response to the actuation of the apparatus of FIG. 6.

When a main motor (not shown) of the electronic photographing apparatus is turned ON (FIG. 7A), charger 33 is turned ON by signal 46d (FIG. 7C), and drum 100 in FIG. 6 rotates. Then, after elapsing time T1, the biasing of developer 39 is activated by signal 46f (FIG. 7D).

Thereafter, cassette feeder 101 is turned ON (FIG. 7B), to thereby draw a paper from paper cassette 102. After elapsing time T3, the position of the paper drawn form cassette 102 is detected by paper sensor 104 during the paper being fed to drum 100 (FIG. 7F). After elapsing time T2 from the paper position detection by sensor 104, transfer charger 36 is turned ON by signal 46e (FIG. 7E).

When the transferring operation to the paper is completed, charger 33 is turned OFF (FIG. 7C). Then, after elapsing time T1, the biasing of developer 39 is stopped (FIG. 7D), and the main motor is turned OFF after elapsing time T4 (FIG. 7A).

According to the above operations, microprocessor 46 in FIG. 1 generates signals 46d (FIG. 7C), 46e (FIG. 7E), and 46f (FIG. 7D).

FIGS. 8A-8G are timing charts showing signals produced by timing controller 71 in FIG. 2.

Assume that A, B, and C denote a charging process period, biasing process period, and transferring process period, respectively, and that D denotes one operation cycle period of timing controller 71. Under this assumption, in sequence of periods A, B, and C during period D; A/D conversion, arithmetic operation and latching of the result of the arithmetic operation are repeated for each of charging, biasing, and transferring. In this case, while one processing (e.g., transferring) is selected (i.e. turned-ON), the remains (charging & biasing) are stopped (i.e. turned-OFF).

Figure 8A:
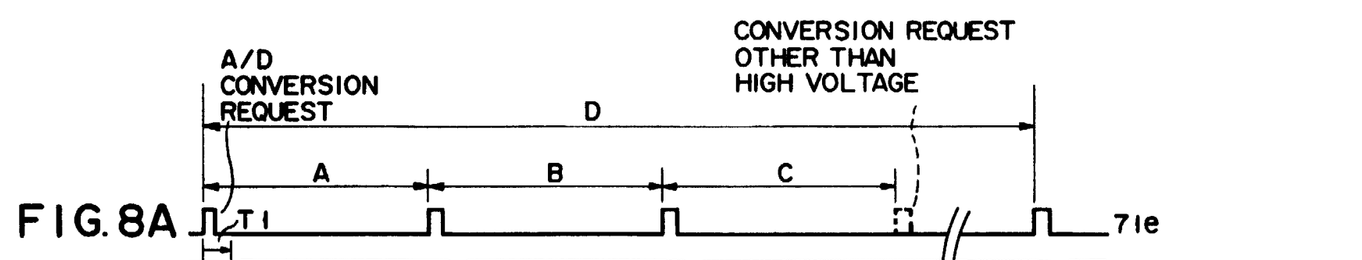
Figure 8B:
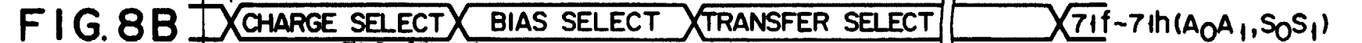
Figure 8C:
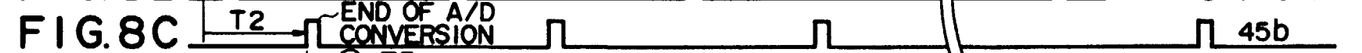
Figure 8D:
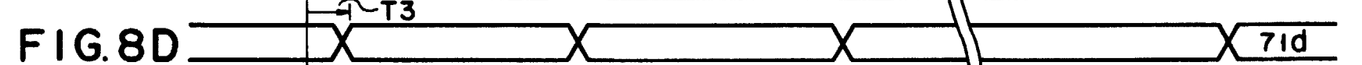
Figure 8E:
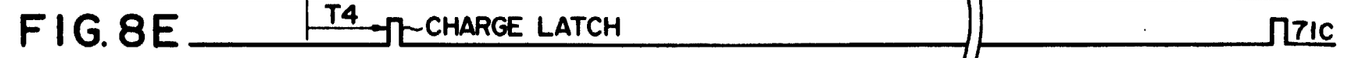
Figure 8F:
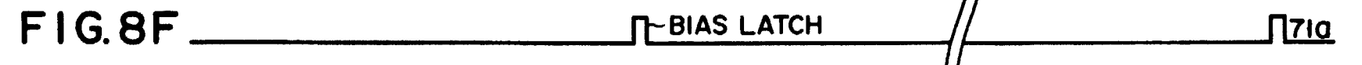
Figure 8G:
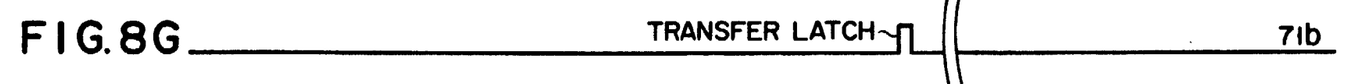

When entered to charging process period A, timing controller 71 outputs A/D conversion request 71e (FIG. 8A). After elapsing T1, the charging processing is first selected by signals 71f-71h (FIG. 8B). Thereafter, within a period of T2, the conversion by A/D converter 45 is completed, and conversion completion signal 45b is generated (FIG. 8C).

After elapsing time T3 from the generation of conversion completion signal 45b, signal 71d is output (FIG. 8D), so that hex "01" (at starting of the system) or hex "FE" (during normal operation) is selected. Signal 71d is then sent to data generator 84 in FIG. 3.

After elapsing time T4 from the generation of conversion completion signal 45b, timing controller 71 outputs charging latch signal 71c (FIG. 8E). By signal 71c, the result of charging process (i.e. charging monitor voltage 41a) is held at latch 60 in FIG. 2.

In a similar manner, the result of biasing process (i.e. biasing monitor voltage 43a) is held by signal 71a (FIG. 8) at latch 62 during period B, and the result of transferring process (i.e. transferring monitor voltage 42a) is held by signal 71b (FIG. 8G) at latch 61 during period C.

Incidentally, the above periods may be set normally as A=B=C and D>>A+B+C.

Figure 9:
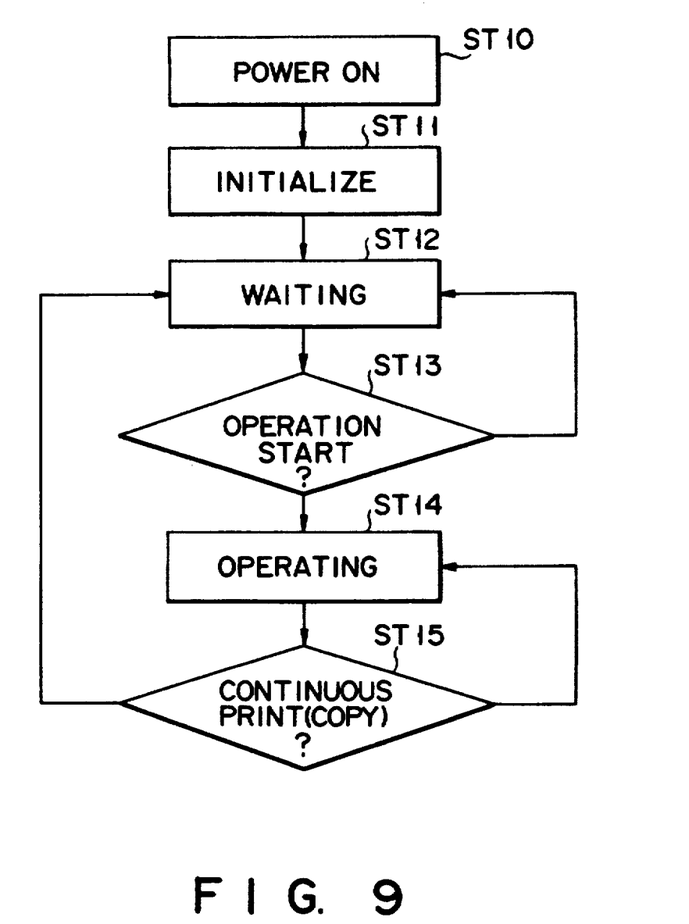
FIG. 9 is a flow chart for explaining operation of the microprocessor in FIG. 1.

FIG. 9 is a flow chart for explaining the control operation of microprocessor 46 in FIG. 1.

When the power of the apparatus is turned ON (ST10), the apparatus is initialized by signals 46a-46c (ST11). When the initialization is completed, the apparatus enters a waiting stage for next operation (ST12). When a copy operation starts (YES in ST13), for example, given operations are performed with timing of the signals shown in FIGS. 7A-7F (ST14). If these operations are tasks of a continuous operation, they are repeated until the continuous operation is finished (YES in ST15). When the operation is finished, the control returns to the waiting stage of step ST12.

Incidentally, when the apparatus of FIG. 1 is provided with an operation mode in which respective reference values of charging, transferring, and biasing can be switchable, the initialization processing may be performed in the waiting stage of step ST12.

As described above, according to the present invention, a high voltage power supply controlling apparatus, which can use one PWM controller and one A/D converter commonly in a plurality of high voltage generation control operations, can, therefore, reduce the number of circuit members to be used, can render the apparatus compact, and can improve operation efficiency of the PWM controller.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power supply control apparatus comprising:
    means for generating electric power in response to switching control signals having given duty ratios;
    means for detecting the electric power generated by said generating means so that monitor voltages corresponding to the detected electric power are provided;
    means for selecting one of the monitor voltages sequentially in accordance with a prescribed timing to output a selected monitor voltage; and
    means for controlling the generated electric power to a prescribed value in accordance with the selected monitor voltage, by changing the duty ratio of the switching control signal.

2. An apparatus according to claim 1, wherein said generating means includes:
    first generating means for generating first electric power in response to one of the switching control signals, said one switching control signal having a first given duty ratio; and
    second generating means for generating second electric power in response to another one of the switching control signals, said other one of said switching control signals having a second given duty ratio;
    said detecting means includes:
        first detecting means for detecting the first electric power generated by said first generating means so as to provide a first monitor voltage; and
        second detecting means for detecting the second electric power generated by said second generating means so as to provide a second monitor voltage; and
    said selecting means includes means for selecting one of the first and second monitor voltages to provide the selected monitor voltage.

3. A high voltage power supply control apparatus which includes a plurality of high voltage transformers, and causes said high voltage transformers to generate high voltages upon switching operations of corresponding switching elements so as to apply the high voltages to loads, comprising:
    monitor voltage detector means for respectively monitoring changes in high voltages generated in said high voltage transformers;
    analog-to-digital converter means for converting an analog input into a digital value;
    multiplexer means for sequentially selecting monitor voltages from said monitor voltage detector means at predetermined timings, and supplying as the analog input the selected monitor voltage to said analog-to-digital converter means;
    arithmetic operator means for comparing the digital value obtained from said analog-to-digital converter means with a predetermined reference value to provide a comparison result, and adding the comparison result to a feedback value to obtain arithmetic output values corresponding to the monitor voltages;
    latch circuit means for latching the arithmetic output values output from said arithmetic operator means, and supplying the latched values to said arithmetic operator means as the feedback values;
    reference counter means for counting reference clocks; and
    means for controlling duty ratios for the switching operations of said switching elements on the basis of a predetermined frequency reference value, the values latched by said latch circuit means, and a count value from said reference counter means.

4. An apparatus according to claim 3, wherein said arithmetic operator means includes means for outputting an error signal when the arithmetic output value falls outside a predetermined range.

5. An apparatus according to claim 3, further comprising means for checking the digital value from said analog-to-digital converter, means so that when the digital value falls outside a predetermined range, an error signal is generated.

6. A power supply control apparatus comprising:
    means for generating electric power in response to switching control signals having given duty ratios;
    means for detecting the electric power generated by said generating means so that monitor voltages corresponding to the detected electric power are provided;
    means for selecting one of the monitor voltages sequentially in accordance with prescribed timing to output a selected monitor voltage;
    means for controlling the generated electric power to a prescribed value in accordance with the selected monitor voltage, by changing the duty ratio of the switching control signal; and
    said generating means includes:
        a switching element for performing a switching operation in response to the duty ratio of said switching control signal; and
        a transformer having a primary winding connected to said switching element and having a secondary winding from which a voltage corresponding to the generated electric power is supplied to a given load.

7. An apparatus according to claim 6, wherein said detecting means includes:
    means for detecting an electric amount corresponding to a voltage applied to a load to which the generated electric power is supplied, and outputting the detected electric amount as said monitor voltage.

8. An apparatus according to claim 6, wherein said detecting means includes:
    means for detecting an electric amount corresponding to a current flowing through a load to which the generated electric power is supplied, and outputting the detected electric amount as said monitor voltage.

9. An apparatus according to claim 6, wherein said controlling means includes:
    means for converting an analog amount of the selected monitor voltage into a digital value; and
    digital control means for changing the duty ratio of each of said switching control signals, so that the digital value approaches a predetermined digital reference value.

10. An apparatus according to claim 9, wherein said digital control means includes:
    digital control value providing means for providing a digital control value in response to a difference between the digital value and the digital reference value;
    means for counting a reference clock having a predetermined cyclic period to output a count value;

means for outputting a coincidence signal in response to matching between the count value and the digital control value;

means for generating a frequency reference value having a cyclic period which is half of a cyclic period of the switching control signals;

means for outputting a set signal in response to matching between the count value and the frequency reference value; and means for generating said switching control signals in response to alternative triggering by said coincidence signal and said set signal.

11. An apparatus according to claim 10, wherein said digital control value providing means includes:

first means for temporarily storing the digital control value to provide a prescribed feedback value;

second means for providing a digital differential value in response to a difference between the digital value and the digital reference value; and third means for combining the digital differential value with the feedback value to provide said digital control value.

12. An apparatus according to claim 11, wherein said third means includes:

means for adding the digital differential value to the feedback value to output an added value; and means for comparing the added value with the frequency reference value, so that the added value is outputted as said digital control value when the added value is smaller than the frequency reference value, and the frequency reference value is outputted as said digital control value when the added value is larger than the frequency reference value.

13. An apparatus according to claim 12, wherein said third means includes:

means for outputting value "zero" as said digital control value if at least one of the digital differential value and the added value becomes negative.

14. A power supply control apparatus comprising:

means for generating electric power in response to switching control signals having given duty ratios;

means for detecting the electric power generated by said generating means so that monitor voltages corresponding to the detected electric power are provided;

means for selecting one of the monitor voltages sequentially in accordance with prescribed timing to output a selected monitor voltage;

means for controlling the generated electric power to a prescribed value in accordance with the selected monitor voltage, by changing the duty ratio of the switching control signal; and said generating means includes:

a first switching element for performing a switching operation in response to the duty ratio of a first one of said switching control signals;

a first transformer having a primary winding connected to said first switching element and having a secondary winding from which a first voltage corresponding to the generated electric power is supplied to a first load;

a second switching element for performing a switching operation in response to the duty ratio of a second one of said switching control signals;

a second transformer having a primary winding connected to said second switching element and having a secondary winding from which a second voltage corresponding to the generated electric power is supplied to a second load;

a third switching element for performing a switching operation in response to the duty ratio of a third one of said switching control signals; and a third transformer having a primary winding connected to said third switching element and having a secondary winding from which a third voltage corresponding to the generated electric power is supplied to a third load;

wherein said first load includes a charger of an electronic photographing apparatus, said second load includes a transfer charger thereof, and said third load includes a developer thereof.

* * * * *